United States Patent

[11] 3,622,109

[72] Inventor Gene R. Drew
 El Centro, Calif.
[21] Appl. No. 5,065
[22] Filed Jan. 22, 1970
[45] Patented Nov. 23, 1971
[73] Assignee The United States of America as
 represented by the Secretary of the Navy

[54] VELOCITY CONTROLLED PARACHUTE
 STABILIZATION SYSTEM
 5 Claims, 2 Drawing Figs.

[52] U.S. Cl................................................... 244/147
[51] Int. Cl..................................................... B64d 17/74
[50] Field of Search....................................... 244/147–150,
 142, 152, 141, 145, 122 R, 122 H,
 122 HE

[56] References Cited
 UNITED STATES PATENTS
3,378,218 4/1968 Robertson et al............. 244/147 X
1,909,158 5/1933 Albihn........................... 244/147
2,979,294 4/1961 Buss.............................. 244/148

FOREIGN PATENTS
438,433 8/1948 Italy............................. 142/

Primary Examiner—Trygve M. Blix
Assistant Examiner—F. K. Yee
Attorneys—R. S. Sciascia, George J. Rubens and J. W. McLaren ABSTRACT: A parachute stabilization system which employs a series of parachutes connected in tandem including a main parachute and a pair of forward and aft stabilizer chutes. The aft stabilizer chute is stowed within a releasable bag until deployed. A projectable slug propels the bag to a deployed position where the aft stabilizer chute is withdrawn from the bag, the bag and slug separating from the stabilization system and falling free thereof. The aft stabilizer chute is larger in diameter than the forward stabilizer chute to provide increased drag forces at low speed and improve the seat-man mass stabilization. The aft stabilizer chute is connected to the forward stabilizer chute by a draw line which has a preselected tensile strength. The application of a predetermined load on the draw line during high-speed ejections will break the draw line and jettison the aft chute and materially reduce the applied drag force.

PATENTED NOV 23 1971 3,622,109

INVENTOR.
GENE R. DREW
BY
*George J. Rubens*
ATTORNEYS

VELOCITY CONTROLLED PARACHUTE STABILIZATION SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

This invention relates to parachutes, and more particularly to a parachute stabilization system employing a series of parachutes connected in tandem and sequentially deployed to provide stabilization to a load, such as a pilot and his ejection seat.

U.S. Pat. No. 2,762,588 issued on Sept. 11, 1956, to J. Martin describes a basic parachute stabilization system currently used by the military services. This system is commonly referred to as the Martin-Baker stabilization system and includes a main parachute for supporting the aircrewman after seat-man separation, the main parachute being deployed by a pair of smaller stabilization chutes connected in tandem including the aft or controller chute smaller in diameter than the forward drogue chute. The controller chute is connected permanently to a projectable slug by a draw line, the slug being fired from a gun mechanism mounted in the ejection seat to initiate deployment of the stabilization system. The purpose of the slug is to deploy the stabilization parachutes as quickly as possible which is of paramount importance when ejection occurs close to the ground and the parachute supports personnel. A corollary object is to achieve quick deployment without causing destruction of one or more of the chutes, and is accomplished in the Martin-Baker system by the controller chute causing the drogue chute to squid during ejections at high speeds.

In operational tests of the patented system, it has been found in low speed ejections, i.e., zero to 100 knots, that the permanently attached slug encumbers and misorients the stabilizer chute reducing the efficiency of the stabilization system. In one test, the slug and drogue assembly penetrated the main parachute canopy after deployment and this could foul the main parachute canopy rendering it ineffective. In addition, generated drag forces are marginally low at low speeds and extraction of the main parachute is usually delayed. In other low speed ejection tests, the seat-man mass has been observed to foul with the drogue system or the main parachute canopy. On the other hand, drag forces are marginally high following ejections at high speeds of 500 to 600 knots causing the Martin-Baker ejection seat sometimes to fail structurally due to high drogue forces.

SUMMARY OF THE INVENTION

The parachute stabilization apparatus of this invention includes a series of stabilization chutes connected in tandem, the aft or low-speed stabilizer chute being larger in diameter than the forward or high-speed stabilizer chute. This arrangement generates higher drag forces when deployed at low speeds to quickly stabilize the seat-man mass and to expedite deployment of the main chute which is of paramount importance in low level ejections.

The likelihood of fouling of the parachutes is reduced by making the projectable slug detachable from the parachutes which it deploys. This is accomplished by connecting the slug to a deployment bag in which is packed the aft stabilizer chute and from which the chute is released upon deployment, permitting jettison of the bag and associated slug freely in a separate path apart from the parachute system.

The parachute stabilization system is uniquely capable of performing in a dual-mode operation for both low-speed and high-speed ejections. The draw line connecting the forward and aft stabilizer chutes is designed with a preselected breaking strength, i.e., 2,100 lbs. When the stabilizer chutes are deployed in low-speed ejections, i.e., below 420 ft./sec., both chutes remain connected by the draw line to provide high drag forces and positive stabilization of the seat-man mass. When the stabilizer chutes are deployed in high-speed ejections, i.e., above 420 ft./sec., beyond which an excessive drag force would be generated endangering the ejectee, the draw line breaks to jettison the aft low speed chute and significantly reduce the drag forces to a safe level.

STATEMENT OF THE OBJECTS OF THE INVENTION

An important object of the invention is to provide a parachute stabilization system that will provide a velocity controlled stabilization for a load over a greater velocity range, and having a corollary object which is to provide such stabilization with a dual-mode operation for both low and high velocity ejections.

Another important object is to provide such a parachute stabilization system having a drogue slug which will be detached automatically from the stabilizer chutes after deployment to avoid fouling therewith.

Further objects are to provide a parachute stabilization system which will generate higher drag forces at low speeds to obtain faster seat-man stabilization and main chute deployment, and to generate lower drag forces at high speeds to avoid structural failure to the ejection seat and injury to the aircrewman.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
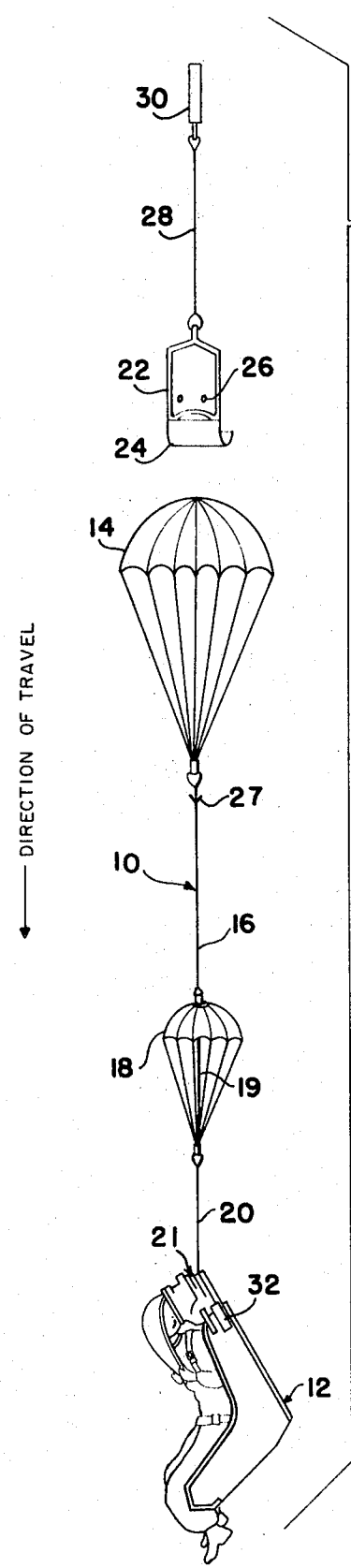
FIG. 1 is a diagrammatic illustration of the parachute stabilization system with the low-speed and high-speed stabilizer chutes having been fully deployed to stabilize an aircrewman in his ejection seat, the drogue slug and its associated chute deployment bag being jettisoned free of the parachute system after releasing the low-speed stabilizer chute.

Referring to the drawing where like reference numerals refer to similar parts throughout the figures, there is shown in FIG. 1 a parachute stabilization system 10 for a load, such as an aircrewman and ejection seat 12. Parachute stabilization system 10 includes an aft or low-speed stabilizer chute 14 connected by a draw line 16 connected to the apex of a forward or high-speed stabilizer chute 18 having an antisquid line 19. High speed chute 18 is in turn connected by a main draw line 20 to a release mechanism and also to the main chute housed in a compartment 21 in seat 12. FIG. 1 shows the escape system prior to deployment of the main chute (not shown).

Prior to deployment, low-speed stabilizer chute 14 is normally packed within a deployment bag 22 and secured therein by a flap 24 and latch mechanism 26 including a closure pin 27 located on draw line 16. Bag 22 is connected by a draw line 28 to a projectile or slug 30, which is hereafter referred to as the slug assembly.

At the commencement of seat ejection, slug 30 is propelled from a gun 32 mounted in seat 12 pulling bag 22 from a seat compartment 21. High-speed chute 18 is also withdrawn from compartment 21 a fraction of a second later by the force of slug 30 acting through bag 22 and draw line 16. Both low-speed chute 14 and high-speed chute 18 inflate almost simultaneously. Both chutes 14 and 18 are stabilizing chutes and inflate about one second prior to inflation of the main parachute (not shown).

One of the features of the present invention is the fabrication of the low-spped chute 14 so as to be larger in diameter than high-speed chute 18, which is the reverse arrangement as used in prior art parachute stabilization systems. For example, in one test system constructed according to the instant invention, the low-speed chute is designed to be 6 feet in diameter, compared to the prior art design which has a diameter of 22 inches. The prior art aft chute is designed to cause the larger forward chute to squid during high-speed deployments to avoid generating such drag forces that would cause seat-destruction. Whereas, the purpose of aft chute 14 of the instant invention is to provide increased drag at low speeds and to obtain faster main chute extraction and deployment, and to improve seat stabilization.

Another feature of the invention is the provision of deployment bag 22 that enables the slug assembly to be detached automatically from the parachute system after deployment of the chutes, instead of being permanently connected as in the prior art systems. Permanent connection between the slug assembly and the stabilization chutes encumbers and misorients the aft stabilizer chute at low speeds, thus reducing its efficiency. Permanent attachment of the slug assembly can also foul and/or damage the main parachute rendering it ineffective.

Another important feature of the invention is to provide a parachute stabilization system having a dual-mode that extends the operating speed envelope. This is accomplished by designing draw line 16, connecting low-speed chute 14 and high-speed chute 18, to have a preselected breaking strength. In one test sample, draw line 16 is fabricated of nylon webbing one-eighth inch thick by three-quarters inch wide and has a breaking strength of 2,100 lbs. In high-speed ejections above 420 ft./sec., the draw line breaks to jettison the low-speed stabilizer chute 14, which significantly reduces the high drag forces being applied to the seat and personnel being supported thereby.

Figure 2:
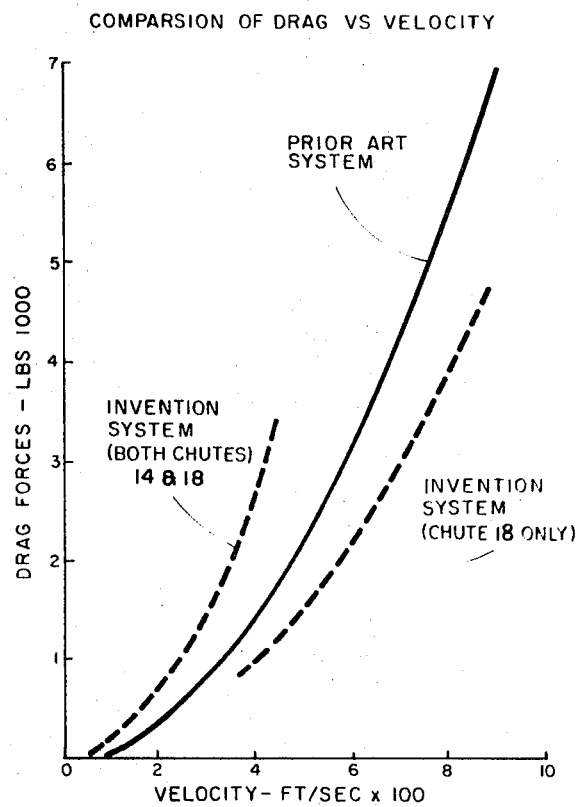
FIG. 2 is a graph showing the comparison of drag vs. velocity for both the prior art parachute stabilization system and the invention system.

The significance of this unique design is clearly seen from the graph in FIG. 2 which compares the drag forces vs. velocity, for the prior art stabilization system shown in solid line with that of the present invention shown in broken lines. In low-speed ejections (i.e., below 420 ft./sec.), both invention chutes 14 and 18 function to increase the drag forces approximately in the order of two. At the value of 420 ft./sec. the drag force significantly drops, which is the point where draw line 16 breaks and reduced values of drag are achieved in the higher velocity range. The two discontinuous curves shown in FIG. 2 represent a dual mode of operation of the invention parachute system for low-speed and high-speed ejections.

OPERATION

The operation of the invention parachute stabilization system will be described throughout the various sequences. Upon ejection of seat 12 from the aircraft, slug 30 is fired from gun 32. The force of slug 30 through tension on draw line 28 pulls from seat compartment 21 both deployment bag 22, in which is packed low-speed chute 14, and immediately thereafter high-speed chute 18 through draw line 16. At this point in time the stabilization chute system is fully extended. At a predetermined point during the extraction of the chutes and while tension is on draw line 16, closure pin 27 disengages locking mechanism 26 to unlock flap 24 of bag 22 freeing low-speed stabilizer chute 14 and allowing extraction therefrom by continued movement of slug 30. Both high-speed chute 18 and low-speed chute 14 inflate almost simultaneously. Meanwhile, the slug assembly is automatically detached from the stabilization system and jettisoned in a separate path. If seat ejection occurs at a velocity under 420 ft./sec.(or any other value designed into the system) high-speed and low-speed chutes 18 and 14 remain connected to provide the high drag forces indicated in FIG. 2, which are substantially higher in value than the prior art system. This is the low-speed mode of operation of the invention system. If on the other hand, ejection occurs at a speed higher than 420 ft./sec., draw line 16 breaks to jettison low-speed chute 14 and prevent the generation of drag forces of such magnitude that might otherwise injure the pilot and/or damage the seat system. This is the second, or high-speed mode of operation of the invention system. As can be seen from the broken curves of FIG. 2, these two modes are a discontinuous function.

SUMMARY OF THE INVENTION

The invention parachute stabilization system incorporates several important features. By reversing the normal disposition of the tandem stabilization chutes of the prior art system, that is, making the aft chute larger than the forward chute, significantly higher drag forces are generated in the low-speed range, thus improving stabilization of the seat-man mass as well as obtaining faster main parachute extraction and deployment when compared to the prior art system. In addition, both low-speed and high-speed chutes operate as stabilizer chutes. By providing such a system of stabilization chutes with a connecting draw line having a preselected strength designed to break at a given speed, lower drag forces are generated at the high-speed range when compared with the prior art systems resulting in a parachute stabilization system having a dual mode operation which functions automatically. All of the above-described advantages are achieved by the invention stabilization chute system that is adaptable to existing ejection seats without requiring extensive design modifications.

Obviously many modifications and variations of the present invention are possible in the light of the above teachings. It is therefore to be understood that within the scope of the appended claims the invention may be practiced otherwise than as specifically described.

What is claimed is:

1. A parachute stabilization apparatus for a main parachute comprising:
   a forward stabilizer parachute;
   an aft stabilizer parachute;
   flexible means connecting said parachutes, said means being separable to provide for jettisoning the aft parachute at a predetermined value of drag force;
   means for deploying said aft parachute, it being the first to be parachute said aft parachute being larger in size than the forward parachute;
   whereby high drag forces are generated at low ejection speeds and low drag forces are generated at high ejection speeds.

2. The parachute apparatus of claim 1 wherein said deploying means comprises:
   a propelling member, a bag for stowing the aft parachute, and flexible means connecting the propelling member and bag, said aft parachute being releasable from the bag for deployment.

3. The parachute of claim 2 wherein said bag has a closure flap and latch means releasable by the flexible means at a predetermined time to allow the aft parachute to be withdrawn from the bag for deployment.

4. The parachute apparatus of claim 1 wherein said flexible means connecting the parachutes has a preselected strength so as to break when the parachutes are deployed in a high-speed ejection to jettison the aft parachute and reduce the drag forces on the suspended load.

5. A dual velocity controlled parachute stabilization apparatus comprising:
   a forward stabilizer parachute;
   an aft stabilizer parachute;
   means for connecting such parachutes in tandem; and
   means for jettisoning the aft parachute at a predetermined value of drag force whereby maximum drag force by use of both parachutes can be achieved at low ejection speeds, and reduced drag forces can be effected at high ejection speeds by jettisoning said aft parachute.

* * * * *

UNITED STATES PATENT OFFICE
CERTIFICATE OF CORRECTION

Patent No. 3,622,109　　　　　　　　Dated November 23, 1971

Inventor(s) Gene R. Drew

It is certified that error appears in the above-identified patent and that said Letters Patent are hereby corrected as shown below:

Column 4, line 32, "parachute", first occurrence, should read -- deployed -- .

Signed and sealed this 17th day of October 1972.

(SEAL)
Attest:

EDWARD M. FLETCHER, JR.　　　　　　ROBERT GOTTSCHALK
Attesting Officer　　　　　　　　　Commissioner of Patents